Inventor,
C. O. T. Montelius

Patented Oct. 5, 1943

2,331,218

UNITED STATES PATENT OFFICE 2,331,218

CONTROLLING MEANS FOR HYDRAULIC MOTORS

Carl Oscar Torsten Montelius, Stockholm, Sweden, assignor to Aktiebolaget Imo-Industri, Stockholm, Sweden Application March 17, 1939, Serial No. 262,575
In Sweden September 5, 1938

2 Claims. (Cl. 60—53)

For the control of the speed of hydraulic motors there is generally made use of a valve, which, in case of the hydraulic motor being driven by a pump having a constant capacity, permits a certain quantity of liquid being by-passed without entering the motor. In case of the motor being driven by pressure liquid from an accumulator or pressure conduit, the valve is so adjusted that the quantity of liquid caused to flow to the hydraulic motor corresponds to the desired number of revolutions. In both cases the said simple means comprising hand-operated valve is not entirely satisfactory, in as much as the number of revolutions of the motor varies to a great extent at variations of the load, and for such reason a satisfactory speed control often cannot be obtained.

The present invention has for its object to improve the speed control of such motors and consists essentially in this that the valve device, which, by regulating the quantity of liquid passing through the said motors, directly controls the speed or the direction of rotation of the motors, is arranged to be adjusted through the difference of speed of a shaft driven by the hydraulic motor and a second shaft driven by a control motor.

Figure 1:
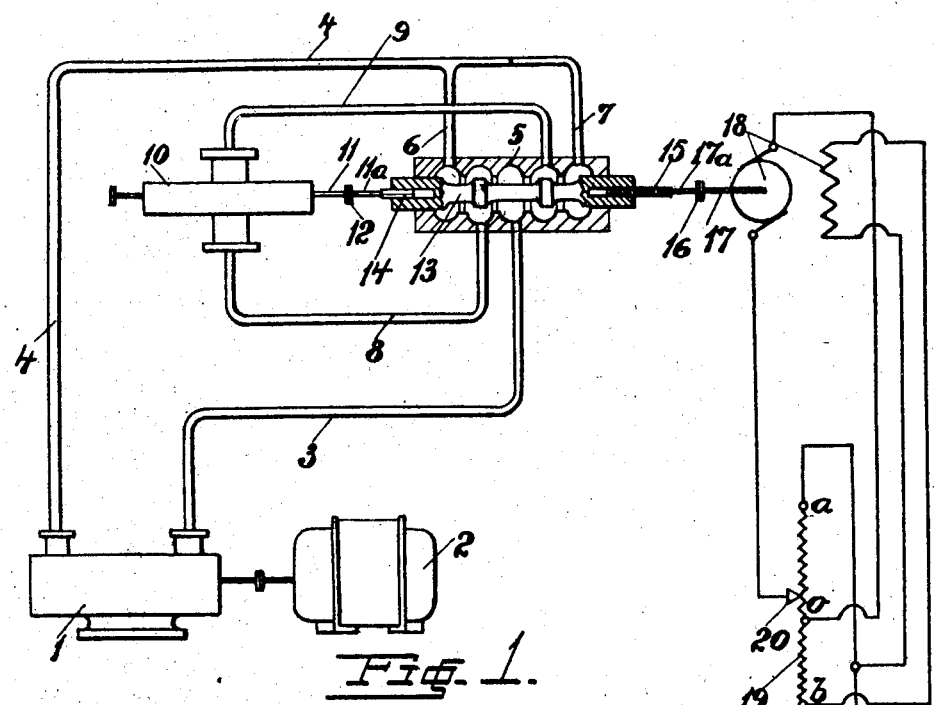
Figure 2:
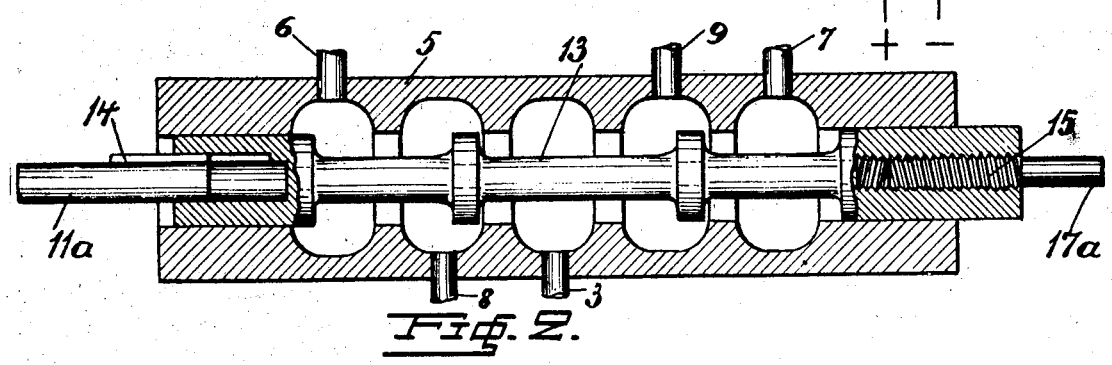
Figure 3:
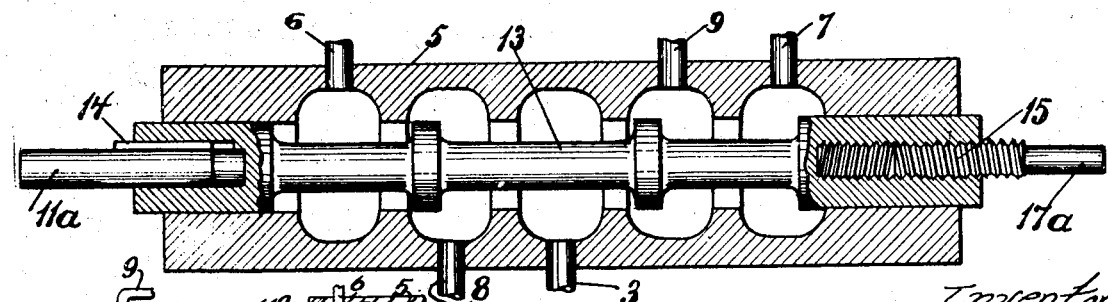

In the annexed drawing an embodiment of a control means according to this invention is shown. Fig. 1 shows diagrammatically the control means as a whole. Figs. 2 and 3 are axial sections of the control valve on an enlarged scale, showing the valve in two different positions.

Figure 4:
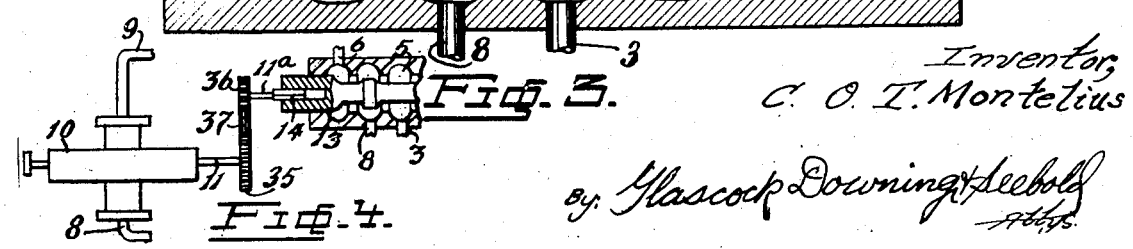

Fig. 4 shows a modification of the embodiment according to Fig. 1, some parts being broken away for the sake of simplicity.

Referring to Fig. 1, 1 designates a pump, which is driven at a constant number of revolutions by an electric motor 2. The pressure pipe of the pump is designated by 3 and its suction pipe by 4. The pressure pipe 3 opens centrally in a valve housing 5, while two branch pipes 6 and 7 of the suction pipe 4 are connected at the ends of the valve housing. Connected to the said housing are further two pipes 8 and 9, which form communications between the valve housing and a hydraulic motor 10, the speed of which is to be controlled. The shaft 11 of the said motor is connected to a valve member 13 rotatable and axially displaceable in the housing 5 by means of a coupling 12 and a shaft 11a, a slidable key connection 14 or the like being provided between said latter shaft and the valve member permitting of an axial displacement of said valve member.

Threaded into the other end of the valve member 13 is a screw 15 having a shaft 17a, which is connected to the shaft 17 of a direct current electric control motor 18 by means of a coupling 16. The field winding of the motor is connected directly to the direct current mains, while the direction and speed of the rotor is controlled by an adjustable resistance 19 and a sliding contact 20 cooperating therewith.

If the contact 20 be placed at a, the motor runs at full speed in the one direction, while the speed is reduced when moving the contact in the direction towards the point o. At further displacing the contact from o in the direction towards b the direction of the rotation is reversed, and at b the motor runs at full speed in the reverse direction.

If it be assumed to begin with that the hydraulic motor 10 and the electric control motor 18 run at the same speed in the same direction, the valve member 13 takes up a certain determined position in the valve housing 5, and the pressure liquid from the pump 1 flows through the pressure pipe 3 to the valve housing and from there (depending on the position of the valve member 13) for instance through the pipe 9 to the hydraulic motor 10 and then through the pipe 8, the valve housing 5, the branch pipe 6 and the suction pipe 4 back to the pump 1 (the valve position shown in Fig. 2).

If now the speed of the control motor 18 be changed, a relative rotary movement will take place between the shaft 11 of the hydraulic motor with the shaft 11a and the valve member 13 on the one hand and the shaft 17 of the control motor with the shaft 17a and the screw 15 on the other hand, and thus an axial displacement of the valve member will take place due to the screw connection. If the speed of the control motor is reduced, the valve member 13 will be moved in the direction from the right towards the left in Fig. 2, so that part of the pressure liquid entering into the valve housing through the pressure pipe 3 will pass directly to the branch pipe 7 and through the suction pipe 4 back to the pump 1, resulting in a reduced liquid supply to the hydraulic motor and, as a consequence, in a reduced speed of said motor. An increase of the speed of the control motor 18 will cause a displacement of the valve member in the opposite direction, resulting in an increased liquid supply to the hydraulic motor and an increased speed thereof. When the speed of the two motors is equal, the valve member will again take up a determined position.

If, on the other hand, due to an increase or a decrease of the load of the hydraulic motor, the speed of said motor should be reduced or increased, respectively, the valve displacements will take place in the reversed directions, that is to say, the valve will be adjusted for an increased or decreased liquid supply, respectively, until the speeds of the two motors will again be equal.

If the direction of rotation of the control motor 18 be reversed by moving the sliding contact 20 to a position between o and b or at b, the valve member 13 will be moved to the position shown in Fig. 3, in which the liquid from the pressure pipe 3 will pass from the valve housing 5 through the pipe 8 to the hydraulic motor 10 and from there through the pipe 9 to the valve housing and then through the branch pipe 7 to the suction pipe 4 of the pump. Thus, also the direction of movement of the hydraulic motor will be reversed. For the rest the controlling operations take place in the manner described above.

It is obvious that the hydraulic motor or the control motor or both—by means of any suitable power transmission means, for instance a gearing of any kind—may indirectly drive the shafts 11a and 17a, whereby the hydraulic motor may rotate at any desired speed, if only at determined valve positions the shafts 11a and 17a be driven at the same speed.

Fig. 4 shows such an embodiment, in which the shaft 11a is driven from the shaft 11 of the hydraulic motor 10 by means of a sprocket wheel and chain drive 35, 36, 37 permitting the hydraulic motor of running at a less speed than does the control motor, which is connected to the valve body 13 exactly in the same way as shown in Figs. 1 to 3.

Further, it is evident that in the embodiment according to Figs. 1 to 3 the shaft 11a may be connected to the valve body 13 by means of a threaded connection and the shaft 17a by means of a key connection.

An arrangement according to the invention may be applied for instance to paper-making machines, reversible rolling-mills, tower-clocks and the like.

What I claim as new and desire to secure by Letters Patent of the United States of America is:

1. In combination, a pressure liquid source, at least one hydraulic motor in communication with said pressure source, a valve device in said communication controlling the flow of liquid through said hydraulic motor, an electric control motor, a shaft driven by said hydraulic motor, a second shaft driven by said electric control motor, connections between each of said shafts and said valve device operative, at relative rotary movements of said shafts, to bring about adjustments of the valve device to cause adjustments of the speed of the hydraulic motor to that of the electric control motor, an electric circuit including said electric control motor and having a constant terminal voltage, and a potentiometer in said circuit operative to supply a controllable voltage to the armature of the electric control motor to vary the speed thereof.

2. A device according to claim 1, characterized by the valve device and the potentiometer being made to reverse the direction of rotation of the hydraulic motor and the control motor, respectively.

CARL OSCAR TORSTEN MONTELIUS.